United States Patent [19]

Gray et al.

[11] 4,277,111
[45] Jul. 7, 1981

[54] SUPPORT ELEMENT FOR COMPLIANT HYDRODYNAMIC THRUST BEARING

[75] Inventors: Stanley Gray, Skaneateles; Hooshang Heshmat, Troy, both of N.Y.

[73] Assignee: Mechanical Technology Incorporated, Latham, N.Y.

[21] Appl. No.: 974,256

[22] Filed: Dec. 29, 1978

[51] Int. Cl.³ .................................................. F16C 32/06
[52] U.S. Cl. ........................................ 308/9; 308/160; 308/DIG. 1
[58] Field of Search .................... 308/9, 26, 36.3, 160, 308/168, DIG. 1

[56] References Cited

U.S. PATENT DOCUMENTS

| 3,382,014 | 5/1968 | Marley | 308/9 |
| 3,809,443 | 5/1974 | Cherubim | 308/9 |
| 4,082,375 | 4/1978 | Fortmann | 308/160 |

Primary Examiner—Richard R. Stearns
Attorney, Agent, or Firm—Joseph V. Claeys; John M. Neary

[57] ABSTRACT

A compliant hydrodynamic fluid thrust bearing tolerant of strong misalignment forces includes two radially outside sections and a radially inside section, all lying generally parallel to the direction of rotation of the thrust runner. The outside sections are more compliant than the inside section of the bearing and can deflect independently of it to conform independently with a misaligned thrust runner bearing surface without distorting other portions of the bearing. The surface area of the bearing which is thus made available to bear loads is maximized, thereby increasing load capacity and misalignment tolerance of the bearings.

11 Claims, 6 Drawing Figures

SUPPORT ELEMENT FOR COMPLIANT HYDRODYNAMIC THRUST BEARING

BACKGROUND OF THE INVENTION

Compliant hydrodynamic gas thrust bearings are being used in high performance machinery subject to extreme conditions of temperature and speed. These bearings are ideally suited for these conditions because they do not suffer from the speed and durability limitations of rolling element bearings. Also, they do not require oil lubrication and therefore are free of the temperature limitations of oil. In addition, the oil seals and the pumping, cooling and filtering equipment necessary for use in oil bearings are rendered unnecessary, thereby producing a significant weight and cost saving which is desirable, especially in aviation applications.

The typical compliant hydrodynamic thrust bearing employs a plurality of bearing pad assemblies, each including a resilient supporting element and an attached overlying bearing sheet. The pads are mounted on the surface of the thrust plate in bearing relationship to the thrust runner. Briefly, the theory of this bearing posits a hydrodynamic supporting gas film generated by the relative movement of the thrust runner over the bearing sheet to support the thrust runner on a thin cushion of gas. The compliance of the supporting element underlying the bearing sheet enables it to deflect to assume the optimum shape relative to the thrust runner surface to produce the maximum supporting fluid pressure over the greatest area. It also enables the bearing sheet to conform, to some extent, to misaligned, unbalanced, and thermally distorted thrust runners.

Despite the proven advantages that the use of these bearings confer, we have recognized certain potential advantages which may accrue from a refinement of these bearings for certain high load or potential misalignment applications such as moving equipment including ground vehicles and particularly aviation applications. High speed rotating machinery experiences a strong gyroscopic effect during deviation from straight-line motion, causing strong transaxial forces to be exerted on the bearings. These forces are proportional to the moment of inertia of the rotor, the rotation speed of the rotor, and the angular velocity of vehicle executing the maneuver. Increasing the rotor speed, and the speed and maneuverability of the vehicle increases these transient transaxial forces to the extent that, during certain evasive movements of high performance fighter aircraft, for example, the forces can exceed the load capacity of the bearing. Failure can occur in misalignment situations when the load borne by the bearing is concentrated in a small area of the bearing surface, and the fluid film between the relatively rotating parts in that small area is unable to carry the load tending to force those parts together. When this happens, the metal surfaces come into contact at high rotational speeds causing damage to the bearing.

SUMMARY OF THE INVENTION

Accordingly, the objectives of this invention are to provide a compliant hydrodynamic fluid thrust bearing with improved load capacity, and with a greater tolerance of misaligned load conditions.

These objectives are satisfied by the disclosed embodiment of the invention which is based on our hypothesis that the load-carrying capacity of a fluid film bearing supporting a misaligned shaft can be greatly increased if the outside portion of the bearing is able to deform and spread the load, otherwise carried by the outside peripheral edge of the bearing, over a greater area of the bearing surface, so that the extreme outside edge of the bearing need not carry the entire misalignment load. We later confirmed by testing that a thrust bearing provided with outside portions which are softer than and independently compliant of the inside portions is able to carry the misalignment load over a significantly increased area of load-bearing surface. The resulting redistribution of load over a greater area subjects the load bearing surface to lower pressures which the bearing is able to carry. The embodiment is a thrust bearing having pads with radially outside portions formed by separate resilient support sections having a stiffness different from the radially inside portion, and which can deform independently of the inside portion.

DESCRIPTION OF THE DRAWINGS

The invention and its objects will become more clear upon reading the following description in conjunction with an examination of the following drawings, wherein.

DESCRIPTION OF THE PREFERRED EMBODIMENT

Figure 1:
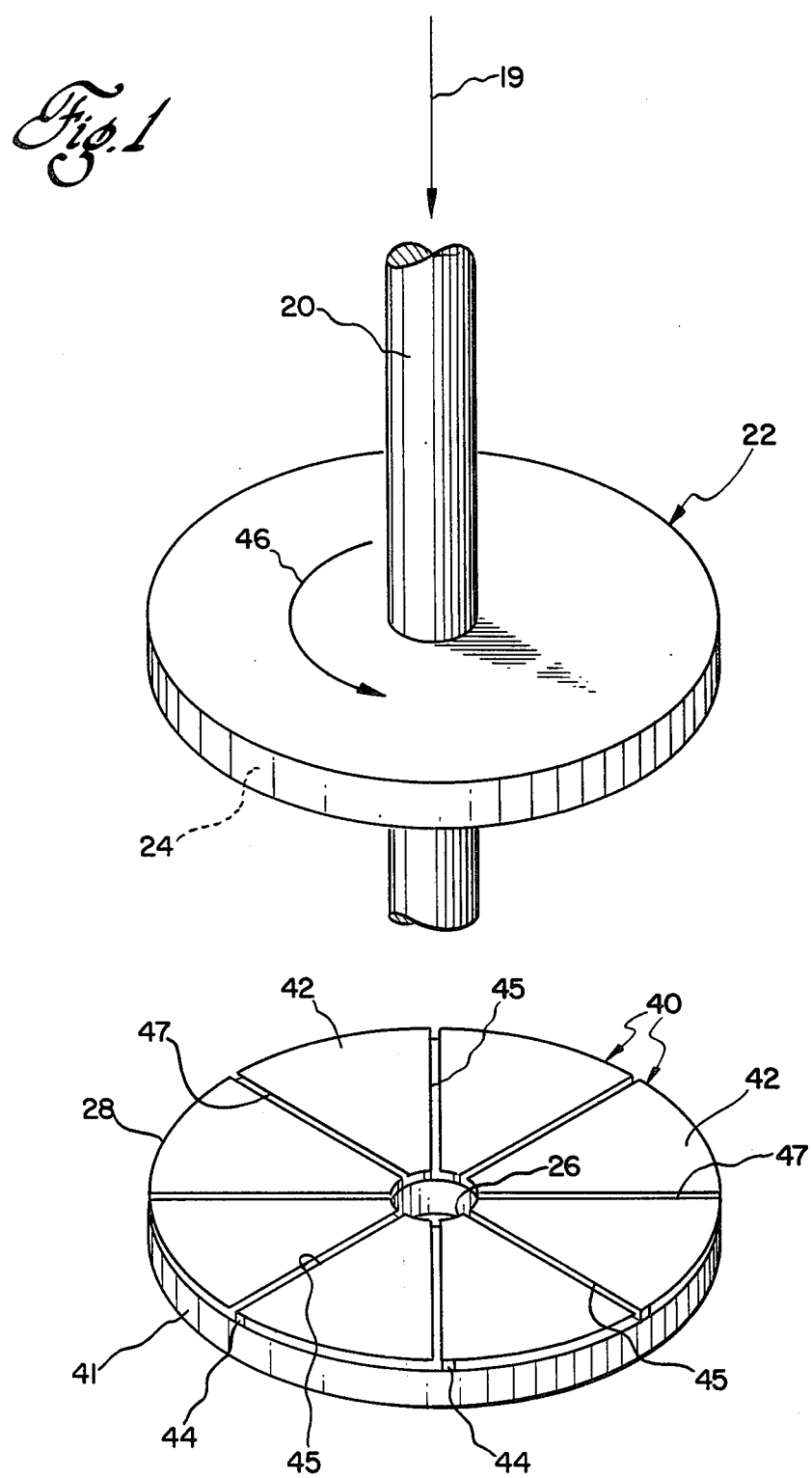
FIG. 1 is a perspective view of a thrust bearing made in accordance with this invention.

Referring now to the drawings wherein like reference characters designate identical or corresponding parts, and more particularly to FIG. 1 thereof, a compliant hydrodynamic fluid thrust bearing is shown for supporting the axial thrust 19 of a rotating shaft 20. A thrust runner 22 having a downwardly facing bearing surface 24 is fastened to the shaft and rotates with it. The axial thrust of the shaft 20 and runner 22 is borne by a plurality of thrust pad assemblies 40 fastened to the top surface of a stationary thrust plate 41.

Figure 2:
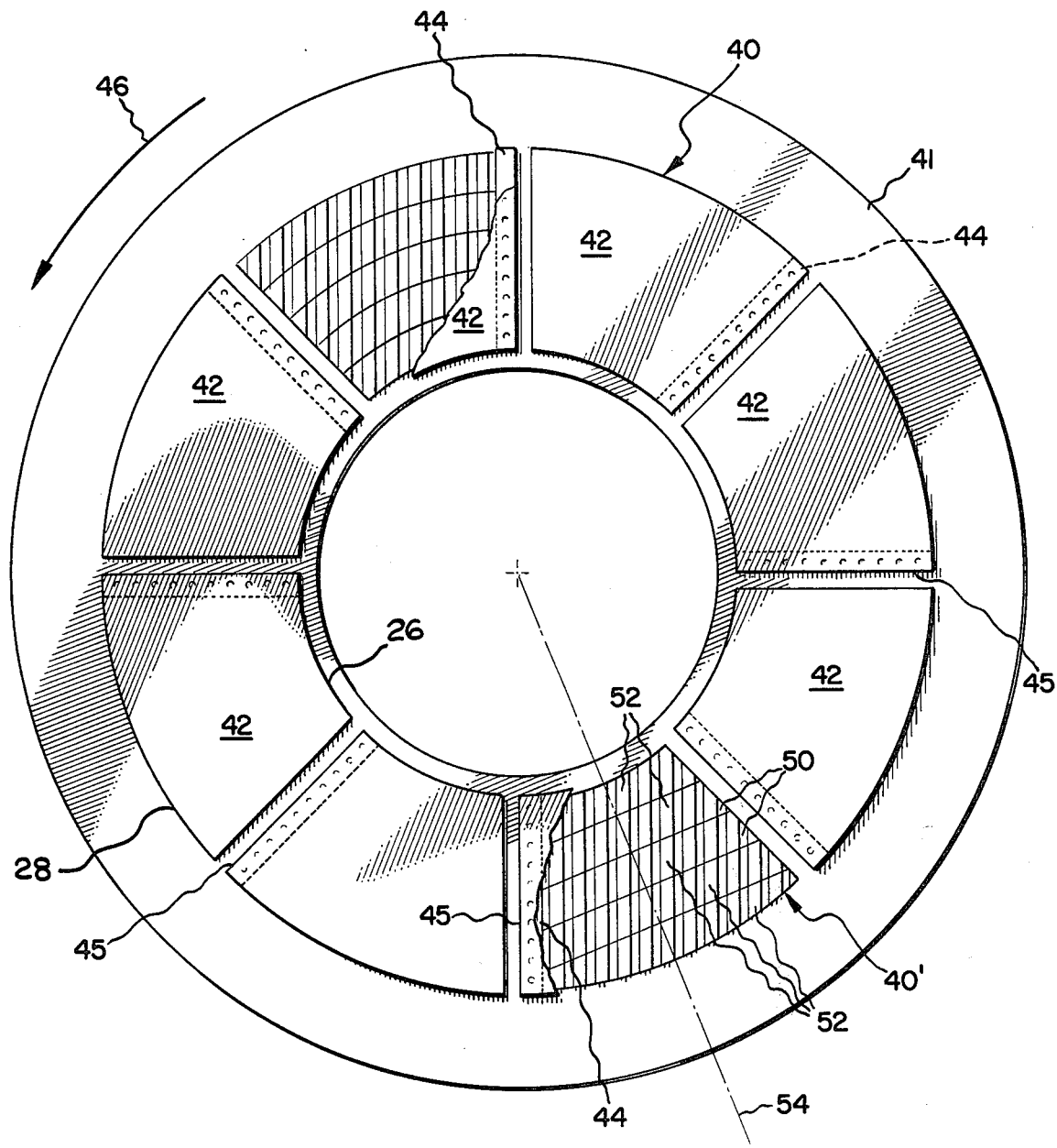
FIG. 2 is a plan view of the thrust plate of the bearing shown in FIG. 1.
Figure 3:
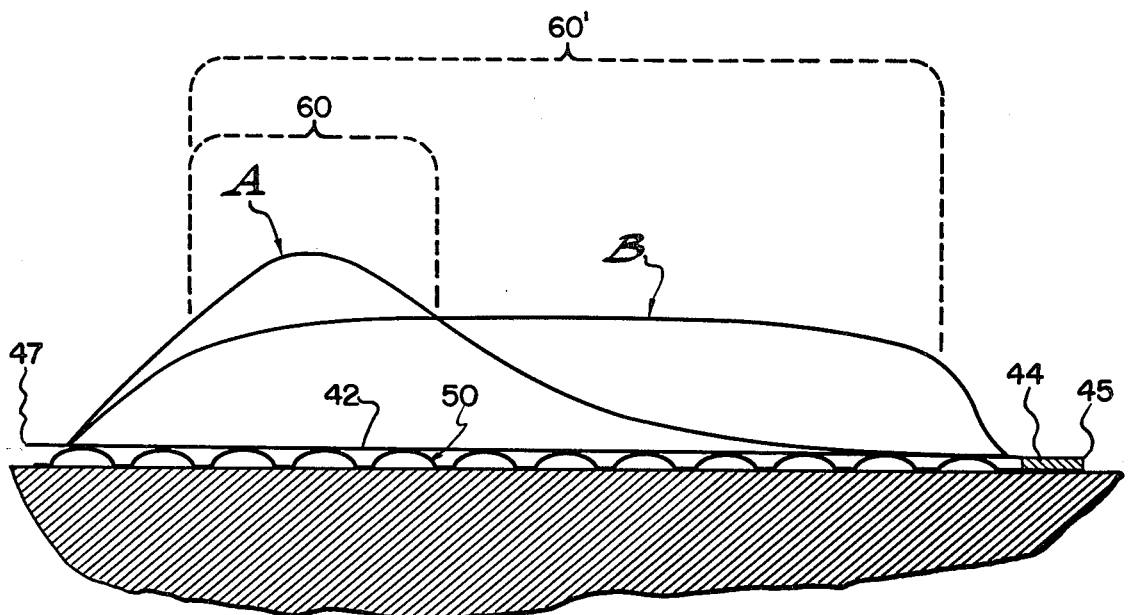
FIG. 3 is an elevation of a thrust pad along lines 3A—3A and 3B—3B in FIGS. 5 and 6 respectively, and the pressure diagrams of the hydrodynamic supporting fluid over the bearing sheet in the prior art (A) and this invention (B)

Each thrust assembly 40, best seen in FIGS. 2 and 3, is in the form of a truncated sector having an inside periphery 26 and an outside periphery 28. Eight pads are illustrated in this embodiment although fewer or more pads can be used for smaller or larger thrust bearings respectively. Each pad includes a thrust bearing sheet 42 welded to the top surface of a spacer block 44 at the leading edge 45 of the bearing sheet in the direction of the rotation of the thrust runner, shown by arrow 46, and free at the trailing edge 47. The spacer block 44 is, in turn, welded along its bottom face to the leading edge of a resilient support element 50. The resilient support element is in a corrugated form, shown in pad 40 with the bearing sheet partially removed (for purposes of illustration) with the axes of the corrugations lying parallel to the leading edge 45 of the pad. The bearing sheet 42 overlies the resilient support element 50 and is compliantly supported thereby to enable the bearing sheet to conform to the plane of the thrust runner to assume the correct hydrodynamic profile under the influence of hydrodynamic forces generated by the relative movement of the thrust runner over the bearing sheet.

As discussed more thoroughly in the copending application of D. F. Wilcock, application Ser. No. 974,260 entitled "Compliant Gas Thrust Bearing with Profiled and Apertured Thrust Runner" filed on Dec. 29, 1978, (the disclosure of which is hereby incorporated by reference) the thrust bearing system will normally include a pair of thrust bearings to give thrust capacity to the rotor in both axial directions.

The corrugated resilient support element 50 is very compliant in the direction perpendicular to its corrugations, that is, it will bend easily about an axis parallel to the corrugation axes; but it is quite stiff in the direction of its corrugations, that is, it will not bend easily about an axis lying perpendicular and through all the corrugations. The effect of this stiffness in the presence of misalignment loads exerted by the thrust runner on the thrust plate is to concentrate the load borne by the bearing on the radial outside edges of the pads, which can result in a pressure that exceeds the load-carrying capacity of the bearing. If the gas film is breached, the thrust runner will contact the bearing sheet at high speed and damage of the thrust bearing can occur.

To increase the load capacity and enable the bearing to survive misalignment loads, we form the resilient support element 50 in a number of parallel, segmental or chordal strips 52, best shown in FIG. 2, running perpendicular to the radial centerline 54 of each pad 40. Five strips are illustrated, but other numbers of strips, from three in a small bearing to nine or more in a large bearing, can be used. These strips give the support element 50 a greatly reduced stiffness about an axis parallel to the direction of movement of the thrust runner and they are able to deflect independently of each other. A support element so formed can support the bearing sheet in a manner which enables it to conform to the non-planar excursions of the thrust runner bearing surface caused by misalignment loads on the rotor. The ability of the segmental strips 52 to deflect independently will enable the resilient support element to distribute the total load more uniformly across its surface, thereby reducing the localized pressure at areas such as the outside edges which previously bore a disproportionate amount of the load. The result is that the total load-carrying capacity of the bearing is increased substantially.

An easy method of forming the resilient support element is to cut slits into the sheet of material from which it is to be formed, leaving an uncut area along the leading edge. The slit sheet can be formed in a die in the usual manner and then welded at its leading edge, also in the usual manner. The fabrication procedure is thus almost as easy as that for the standard thrust pad.

Alternatively, the resilient support element can be formed from several strips of material. This makes it possible to match the stiffness and strength of each individual strip to the loads and operating conditions which the corresponding area of the bearing will experience in operation. Thus, the radially outside strip could be somewhat more compliant than the next inner strip, despite its greater load, to enable it to deflect readily under misalignment conditions. This can be achieved by using thinner material or by providing a longer pitch length or a longer bump profile. If thinner material is used, it may be necessary to use some expedient to make the top of its projections coplanar with the projections on the other strips. For example, the surface under the inside strips could be ground to provide a shallow recess, or the outside strips could be made in a die having deeper grooves or valleys.

Figure 4:
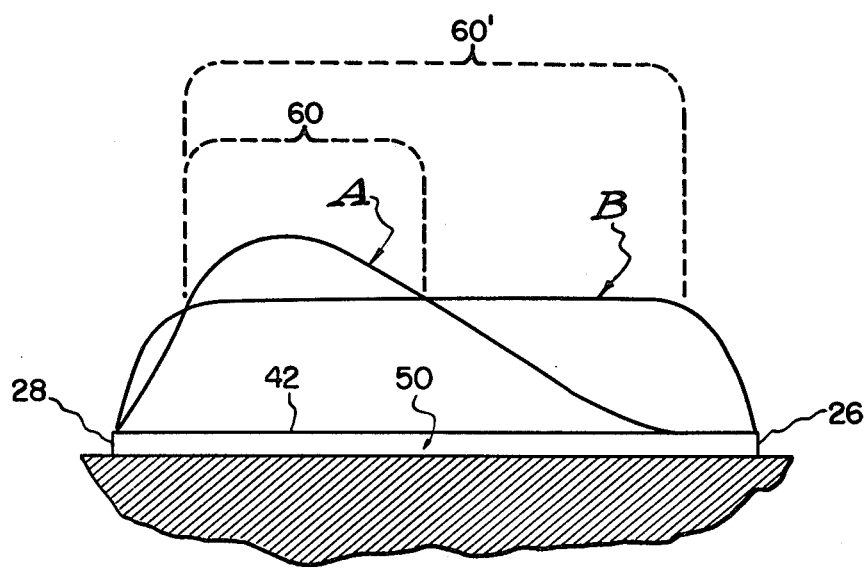
FIG. 4 is an elevation of a thrust pad along lines 4A—4A and 4B—4B in FIGS. 5 and 6 respectively, and the pressure diagrams of the supporting hydrodynamic fluid over the bearing sheet in the prior art (A) and this invention (B)
Figure 5:
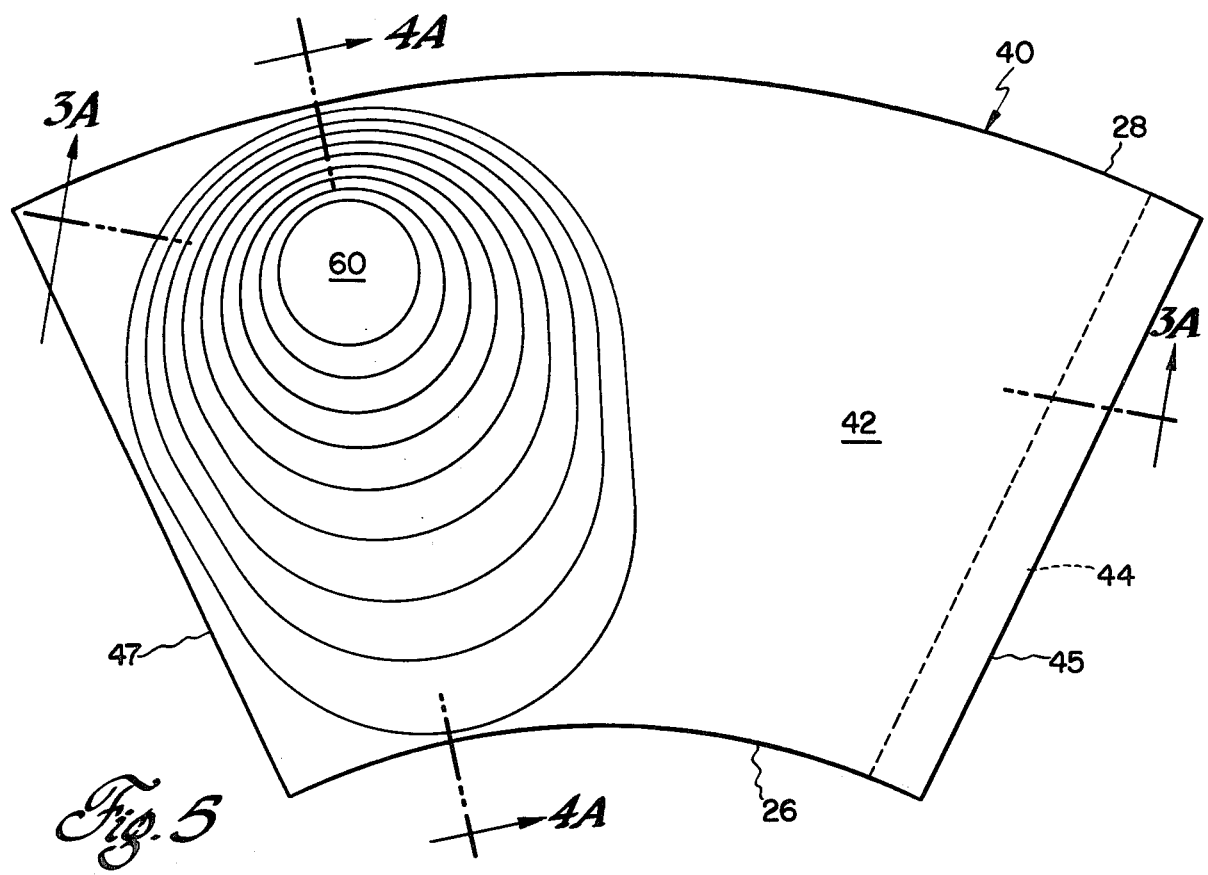
FIGS. 5 and 6 are plan views of thrust pads of the prior art and this invention, respectively, showing pressure gradient lines of the supporting hydrodynamic fluid over the bearing sheet.
Figure 6:
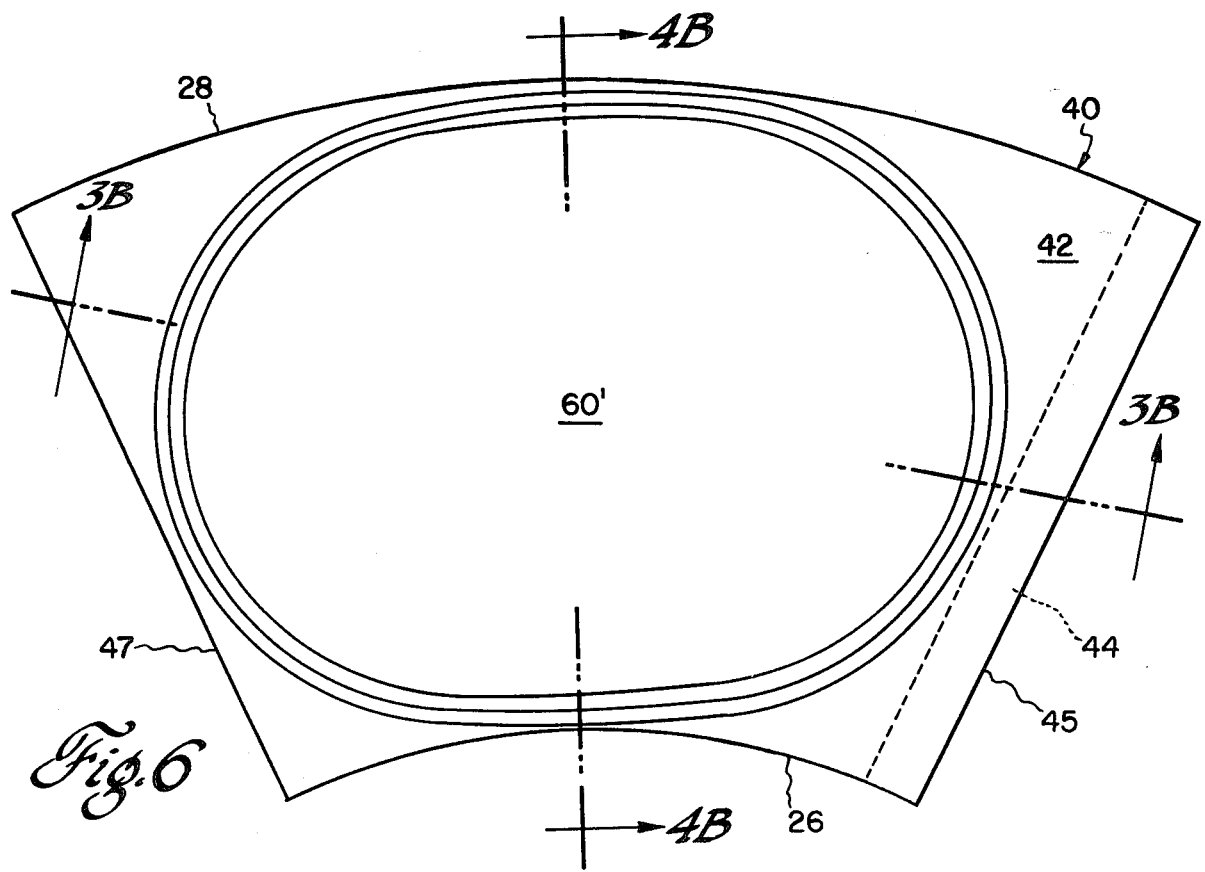

FIGS. 5 and 6 represent our understanding of the film pressure profile over a prior art and the inventive thrust bearing compliant hydrodynamic pad, respectively, under a typical aligned loading situation. The highest pressure supporting fluid in the prior art bearing is believed to be in a zone 60 in the outside downstream quadrant of the pad. This high pressure zone, as shown as the crest of curve A in FIGS. 3 and 4, drops gradually in pressure toward the leading edge 45 and inside periphery 26; it drops more steeply toward the trailing edge 47 and the outside periphery 28. The high pressure zone 60 in the inventive bearing shown in FIG. 6 and in the curves B in FIGS. 3 and 4 is considerably larger in area, presenting a plateau shape having a substantially uniform high pressure zone over a broad central area of the bearing pad which falls steeply on all sides. This plateau of pressure, shown in the pressure curves B of FIGS. 3 and 4, encloses a greater area under a the PXA diagram which suggests the availability of greater total supporting force for the thrust runner.

The pressure distribution shown in FIGS. 3–6 is believed to be made possible by the independently compliant strips, each formed of a series of resilient projections. Each strip can deflect independently, and each projection can deflect without affecting the elevation of the other projections. This enables the support element to adjust the elevation of the bearing sheet 42 relative to the bearing surface 24 of the thrust runner 22 so that the gap corresponds to the local loading and runner speed conditions. A high pressure over the outside periphery 28 as the runner 22 speeds up, for example, will cause a deflection of the support elements 50 in that area without affecting the element 50 elsewhere. The load exerted by the runner 22 is thus distributed uniformly over a broad support zone over the bearing sheet, as shown in FIG. 6.

A further exacerbating effect to the operation of a thrust bearing is the thermal distortion of the thrust runner. Heating occurs at the bearing surface as a result of viscous fluid forces which cause an axial temperature gradient through the thrust runner. As a consequence, it tends to "dish" slightly, presenting a convex face to the thrust plate. The gap between the thrust pads and the thrust runner is thus smallest at the inside edges, thereby worsening the condition caused by the radial stiffness of the support element.

Our solution for this problem makes the outside edge portions of the support element independent of, and more compliant than, the other portions of the support element. The support element as a whole thus becomes compliant both parallel to and normal to the direction of rotation of the thrust runner, and deflection of the outside strip has no effect on the other portions, which themselves deflect independently under the loads which they bear. The load distribution across the bearing sheet is thus made more uniform. This is believed to account, at least partially, for the significantly increased load capacity and misalignment tolerance of the thrust bearing.

Numerous modifications and variations of the disclosed embodiment are possible in view of the disclosure, and it is to be expressly understood that these modifications and variations and their equivalents may be practiced while remaining within the spirit and scope of the invention which is defined by the appended claims, wherein we claim:

1. A compliant hydrodynamic fluid film thrust bearing comprising:
   a thrust plate and a relatively rotatable thrust runner, defining therebetween a gap;
   a resilient support element positioned in said gap and connected to said plate, said element having a series of raised compliant resilient projections;
   a flexible bearing sheet connected to and overlying said support element and being supported thereby;
   said support element having an inner circumferential edge and an outer circumferential edge;
   said support element having a radial inner zone adjacent said inner circumferential edge, and two radial outer zones which are radially outboard of said inner zone;
   said outer zones both having portions which are compliant independently of each other and said inner zone, and at least one of said outer zones having a compliance different from that of said inner zone.

2. The bearing defined in claim 1, wherein said inner zone is itself divided into a plurality of inner strips which are themselves compliant independently of each other.

3. The bearing defined in claim 2, wherein each said strip is fastened to said plate along one radially aligned end edge.

4. The bearing defined in claim 2, wherein said inner zone is stiffer than at least one of said outer zones.

5. The bearing defined in claim 1, wherein said zones each include at least one circumferentially extending strip, and said projections are corrugations of said strips, and said outer strips are more compliant than on said inner zone.

6. The bearing defined in claim 5, wherein the width of each said outer edge strips is about one-quarter to one-sixth of the width of the entire support element.

7. The bearing defined in claim 5, wherein said inner zone is itself divided into at least two strips, said inner zone strips and said outer strips all being about the same width.

8. The bearing defined in claim 1, where said radial outer zones each include a sector-shaped edge strip formed by chordwise slits in said support element.

9. The bearing defined in claim 1, wherein said radial outer zones each include an arc-shaped edge strip formed by concentric arcuate slits in said support element.

10. A method of axially supporting a load exerted by a rotating rotor having an attached thrust runner on a stationary thrust plate, when the rotor and bearing are subject to relative misalignment, comprising:
    supporting the thrust runner on a smooth, flexible bearing sheet having a bearing surface in bearing relationship to an opposed bearing surface on the thrust runner;
    supporting the bearing sheet on a resilient, compliant supporting element that deflects under load to enable the bearing sheet to assume a profile that is conducive to the generation and maintenance of a supporting hydrodynamic fluid film between the bearing sheet and the rotating thrust runner;
    said supporting element having two radially outside portions which are radially outboard of the center of said thrust plate and extend parallel to the rotation direction of said thrust runner, and an inside portion which is radially inboard of said outside portions, said two outside portions being compliant independently of said inside portion and being more compliant than said inside portion;
    rotating said thrust runner over said bearing sheet to generate a hydrodynamic supporting fluid film between said bearing surfaces;
    deflecting said outside portions independently of said inside portion in the presence of misalignment conditions to spread the load over a large area of said bearing sheet and thereby minimize the pressure so that fluid film will support the load.

11. A compliant hydrodynamic fluid film thrust bearing comprising:
    two bearing members including a thrust plate and a thrust runner spaced axially apart and defining therebetween a gap, said thrust runner being attached to a rotatable shaft and supporting the axial thrust of the shaft on said thrust plate;
    a bearing assembly including a resilient support element and a flexible bearing sheet supported on said resilient support element, said bearing assembly being positioned in said gap and connected to one of said members;
    said bearing sheet having a bearing surface facing the other of said members;
    said support element having a radial outer circumferential edge and a radial inner circumferential edge;
    said support element having a radial inner zone bounded on its inner edge by said radial inner circumferential edge and on its outer edge by the inner edge of the innermost of said two radial outer zones, the outermost one of which is bounded on its outer edge by said radial outer circumferential edge;
    at least one of said outer zones having a compliance softer than said inner zone; and
    said two radial outer zones and said radial inner zone all being compliant independently of each other.

* * * * *